UNITED STATES PATENT OFFICE.

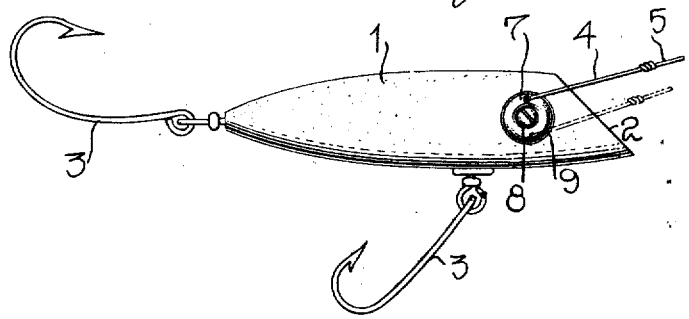
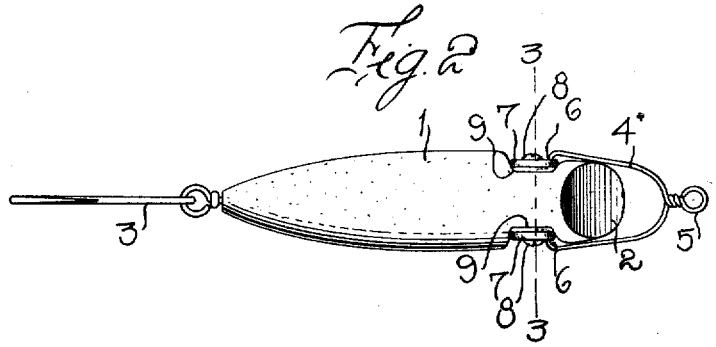
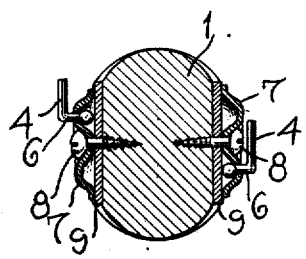

JAMES WILLIAM JAY, OF PHILADELPHIA, PENNSYLVANIA.

MINNOW.

1,242,556.  Specification of Letters Patent.  Patented Oct. 9, 1917.

Application filed December 6, 1916.   Serial No. 135,453.

*To all whom it may concern:*

Be it known that I, JAMES WILLIAM JAY, a citizen of the United States, residing at Philadelphia, in the county of Philadelphia and State of Pennsylvania, have invented certain new and useful Improvements in Minnows, of which the following is a specification.

This invention comprehends certain new and useful improvements in artificial bait, and relates particularly to diving minnows.

The invention has for its primary object to provide a minnow of this character which will float when idle and which will dive when drawn through the water, the invention embodying new features of construction, new arrangements of parts, and new principles whereby a more or less erratic motion may be imparted to the minnow, such motion being capable of variation by simple means hereinafter specifically described and without the use of wings, vanes, furrows, grooves, or similar features which are objectionable, as is well known to those familiar to the art of fishing, to which this invention appertains.

A further object of the invention is to provide a broadly new diving minnow embodying a simple form of oscillating draft member or pivoted bail connected to the body of the minnow in such a manner that the axis about which the draft member or bail swings and which I shall hereinafter refer to as the "axis of oscillation," may be adjusted or varied at will, whereby it will render the minnow susceptible, in connection with a correlated resisting surface, of a wide degree of movements, ranging from a slow leisurely motion to a very erratic and quick movement, simulating the actions of a frightened live minnow, said movements being completely under the control of the angler, according to the adjustments of the parts and the manner in which he handles his rod and reel.

With these and other objects in view, as will more fully appear as the description proceeds, the invention consists in embodying in an artificial bait or minnow certain new principles and certain new arrangements and constructions of the parts which I shall hereinafter fully describe and claim.

For a full understanding of the invention, reference is to be had to the following description and accompanying drawing, in which—

Figure 1 is a side elevation of a minnow embodying the principles and improvements of my invention.

Fig. 2 is a top plan view thereof, and

Fig. 3 is a transverse sectional view taken substantially on the line 3—3 of Fig. 2, but showing one end of the bail or draft member adjusted differently from the other.

Corresponding and like parts are referred to in the following description and designated in all of the views of the accompanying drawing by like reference characters.

Referring to the drawing, the numeral 1 designates the body of my minnow, said body being provided with a resisting surface of any desired shape, so long as it will act in conjunction with the other features of the invention hereinafter specified, to cause the minnow to pivot, so to speak, relative to the draft member or bail hereinafter mentioned, I having shown in the present instance, but merely for the purposes of illustration, the body 1 as provided for this purpose with a forwardly and downwardly inclined planate nose 2, although it is to be understood that the invention is not limited at all in this regard, and it is, therefore, to be understood that the body of the minnow may be of any type, shape or design, and still be within the scope of my invention. I have shown hooks 3 as depending from the tail and belly of the body portion 1, and here again it is to be understood that this is merely for the purposes of illustration, and that any number or types of hooks may be used and connected to the body at any desired points and in any desired way.

4 designates the draft member hereinbefore referred to. This is in the form of a bail, preferably made of wire and provided with a loop 5 whereby it may be attached to a line in any desired way or through the instrumentality of any desired connection; and in the present embodiment of the invention, the ends of the draft member 4 are turned inwardly, as indicated at 6, and pivotally connected, eccentrically, to collars 7 that are mounted to turn about central axes 8 upon opposite sides of the body 1 at, or in predetermined spaced relation to, the nose 2. If desired, and preferably, these axes of rotation of the collars 7 consist of screws which may be tightened as desired to secure the required frictional action to hold the collars 7 in different positions of adjustment rotatably considered; and preferably, washers 9 are interposed between the collars 7 and the adjacent portions of the sides of the body 1 to provide a firm basis of contact when tightening up the screws and to assist in securing the requisite frictional engagement or contact of the parts. At this point, it will be seen, by reference to the drawing, that the collars 7, and particularly said collars in connection with the screws or axes 8, simulate the eyes of a live minnow which is in itself a point of advantage possessed by the device.

From the foregoing description in connection with the accompanying drawing, it will be seen that I have provided a diving minnow in which the parts are so constructed and arranged that the minnow will be caused to pivot, so to speak, on the axis formed where the two ends of the bail wire are attached to the body of the minnow through the instrumentality of the collars 7; that the device permits of a simple adjustment which will permit of the change of the angle of draft of the line and thereby alter the motion two ways, namely, regulate the depth at which the minnow will dive and also vary the wabbling or erratic motion of the artificial bait; that the axis of oscillation of the draft member or bail 4 may be easily shifted by a partial rotation of the collars 7 so as to move said axis either forward or backward and to different degrees above and below the horizontal median line or axis of the minnow body, whereby a very wide range of movements may be secured, both as regards the depth to which the minnow will dive and as regards the wabbling or erratic motion that may be desired; and that as each collar 7 may be turned or adjusted independent of the other, this axis of oscillation may be shifted not only as a whole forward and backward and up and down, but may be shifted also obliquely to the transverse axis of the minnow body. Thus it will be seen that a maximum range of movements may be secured by my minnow and in a very simple manner, the niceties of adjustment, together with the skilful manner in which the angler handles his rod and reel, rendering possible almost countless variations in the movements, and rendering the minnow susceptible of practically absolute control.

While the accompanying drawing illustrates one form or embodiment of my invention for the purpose of assisting in imparting a thorough understanding of the principles involved therein, it is to be understood that the invention is by no means limited thereto, but that various forms of bodies may be employed and various changes made in the construction, arrangements and proportions of the parts without departing from the scope of the invention as claimed.

What is claimed, is:

1. An artificial bait, comprising a body, a freely oscillatable draft member connected thereto in the rear of the forward extremity of the body, and means whereby the position of the axis of oscillation of said draft member may be varied relative to the body.

2. An artificial bait comprising a body, a freely oscillatable draft member connected thereto in the rear of the forward extremity of the body, and means whereby the position of the axis of oscillation of said draft member may be shifted obliquely relative to the body.

3. An artificial minnow comprising a body, a bail, and means adjustably connecting the ends of the bail to the body on opposite sides of the latter whereby either end of the bail may be adjusted relative to the body independently of the other end.

4. An artificial minnow comprising a body, independently movable collars revolubly mounted on opposite sides of the body, and a bail pivotally connected at its ends to said collars.

5. An artificial minnow comprising a body, collars revolubly mounted on opposite sides of the body, and a bail pivotally connected to the collars at eccentric points.

6. An artificial minnow comprising a body, collars revolubly mounted on opposite sides of the body, a bail pivotally connected at its ends to said collars eccentrically thereon, and means for holding said collars at different adjustments, revolubly considered.

7. An artificial minnow comprising a body, collars on opposite sides of said body, screws extending through the centers of said collars into the body and adapted to hold the collars in different positions, revolubly considered, on the body, and a draft member in the form of a bail pivotally connected at its ends to the respective collars at points spaced from the centers thereof.

In testimony whereof I affix my signature in the presence of two witnesses.

JAMES WILLIAM JAY.

Witnesses:
M. H. HOOD,
ROBERT W. LLOYD.